(12) United States Patent
Düpmeier et al.

(10) Patent No.: US 9,494,063 B2
(45) Date of Patent: Nov. 15, 2016

(54) EXHAUST GAS SYSTEM WITH CIRCULATION HEAT PIPE

(75) Inventors: Tobias Düpmeier, Paderborn (DE); Benjamin Reul, Paderborn (DE); Max Niesse, Borchen (DE)

(73) Assignee: BENTELER AUTOMOBILTECHNIK GmbH, Paderborn (DE)

( * ) Notice: Subject to any disclaimer, the term of this patent is extended or adjusted under 35 U.S.C. 154(b) by 705 days.

(21) Appl. No.: 13/480,052

(22) Filed: May 24, 2012

(65) Prior Publication Data

US 2013/0167517 A1 Jul. 4, 2013

(30) Foreign Application Priority Data

May 25, 2011 (DE) .................. 10 2011 103 110

(51) Int. Cl.

| | |
|---|---|
| *F01N 1/00* | (2006.01) |
| *F01N 3/00* | (2006.01) |
| *F01K 23/06* | (2006.01) |
| *F22B 1/18* | (2006.01) |
| *F01N 5/02* | (2006.01) |
| *F28F 1/40* | (2006.01) |
| *F28D 7/10* | (2006.01) |
| *F28D 15/02* | (2006.01) |
| *F28D 15/04* | (2006.01) |
| *F28D 21/00* | (2006.01) |

(52) U.S. Cl.
CPC .............. *F01N 3/00* (2013.01); *F01K 23/065* (2013.01); *F01N 5/02* (2013.01); *F22B 1/18* (2013.01); *F28D 7/103* (2013.01); *F28D 7/106* (2013.01); *F28D 15/0266* (2013.01); *F28D 15/046* (2013.01); *F28F 1/40* (2013.01); *F28D 21/0003* (2013.01); *Y02T 10/16* (2013.01)

(58) Field of Classification Search
CPC ...... F28D 7/106; F28D 7/103; F28D 15/046; F28F 1/40
USPC ......................................................... 60/324
See application file for complete search history.

(56) References Cited

U.S. PATENT DOCUMENTS

| | | | | |
|---|---|---|---|---|
| 2,448,315 | A * | 8/1948 | Kunzog ......................... | 165/119 |
| 3,323,586 | A * | 6/1967 | Burne et al. ................... | 165/154 |
| 6,450,132 | B1 * | 9/2002 | Yao et al. ..................... | 122/366 |
| 2009/0038302 | A1 * | 2/2009 | Yamada et al. ................. | 60/320 |
| 2010/0043415 | A1 * | 2/2010 | Capelle et al. ................. | 60/320 |
| 2010/0071674 | A1 | 3/2010 | Rabe et al. | |
| 2011/0127016 | A1 | 6/2011 | Düpmeier et al. | |
| 2012/0227934 | A1 * | 9/2012 | Huang ..................... | 165/104.26 |

FOREIGN PATENT DOCUMENTS

DE   10 2009 049 196 A1   5/2005

* cited by examiner

*Primary Examiner* — Audrey K Bradley
*Assistant Examiner* — Jason Sheppard
(74) *Attorney, Agent, or Firm* — Henry M. Feiereisen LLC

(57) ABSTRACT

An exhaust gas system includes an exhaust gas pipe with an integrated evaporator. In order to make the evaporator independent of the site of installation and the mounting position, a capillary structure is arranged between the outer sleeve pipe and the exhaust gas pipe. For increasing the efficiency of the evaporator, vapor grooves are provided in an area of an outer sheath surface of the exhaust gas pipe and fluid grooves are provided in an area of an inner mantle surface of the sleeve pipe.

17 Claims, 4 Drawing Sheets

EXHAUST GAS SYSTEM WITH CIRCULATION HEAT PIPE

CROSS-REFERENCES TO RELATED APPLICATIONS

This application claims the priority of German Patent Application, Serial No. 10 2011 103 110.7, filed May 25, 2011, pursuant to 35 U.S.C. 119(a)-(d), the content of which is incorporated herein by reference in its entirety as if fully set forth herein.

BACKGROUND OF THE INVENTION

The present invention relates to an exhaust gas system with circulation heat pipe.

The following discussion of related art is provided to assist the reader in understanding the advantages of the invention, and is not to be construed as an admission that this related art is prior art to this invention.

The operation of internal combustion engines, for example Otto or diesel engines requires combustible fuels. Due to limited oil reserves it is sought to maximize the efficiency of an internal combustion engine and with this the use of the energy contained in the combustible fuel. Due to the Carnot process however, the efficiency of an internal combustion engine for converting the energy contained in the combustible fuel is limited to about 40%.

This means that about ⅔ of the energy bound in the combustible fuel is not used for the actual purpose of the internal combustion engine, i.e. the conversion of chemical energy into mechanical energy but rather is lost as waste energy. In order to nevertheless use this energy, multiple approaches are currently taken in particular in the field of motor vehicles, for example to recover the heat energy or the energy bound in the exhaust gas and to use it in a respective application.

For example, the heat energy is used for heating the passenger compartment of the motor vehicle. In addition, there are also approaches in which thermoelectric generators convert the heat energy contained in the exhaust gas into electrical energy, which in turn can be used for operating a motor vehicle.

In order for an internal combustion engine to operate in an optimal efficiency spectrum, optimal operating conditions have to be established. The internal combustion engine which is predominantly manufactured from metallic materials is configured so that it operates within a good efficiency range at operating temperature. This means the different thermal expansions of the engine block, piston, piston rings, cylinder head, valves and further components are adjusted to one another so that they reach an optimal efficiency at an average operating temperature of the core components of about 90 to 100° C., and at this operating temperature the engine power is maximized and the load change is optimized. Also, the operating media of an internal combustion engine, for example the motor oil as well as transmission oils are optimized for use at the respective operating temperature.

Especially in the cold start phases which can take place at a temperature of 20° C., but which can also occur at starting temperatures of 0° C. or temperatures below zero, it is therefore necessary to quickly reach operating temperatures for the individual components.

For this, approaches are known from the state of the art to withdraw heat from the exhaust gas by exhaust gas heat regeneration and to supply this heat to the site of use. This however, requires heat exchangers in the exhaust gas system which cause an increased exhaust gas counter pressure and thus lower the overall efficiency of the internal combustion engine.

Because of increasing demands to minimize exhaust gas emissions and the associated components for after treatment of the exhaust gases, for example a particle filter or a catalytic converter, it is contra productive to withdraw heat from the exhaust gas in the cold-start phase, because the components for after treatment of the exhaust gases also require energy in order to be fully effective. In addition, a heat transfer medium, in particular water, is used whose efficiency itself is limited and only offers a suboptimal solution.

DE 10 2009 049 196 A1 for example discloses a heat transfer device, in which heat is transported from a heat source to a heat sink in a targeted manner via a heat pipe. Further, the heat transport is controllable.

The afore mentioned state of the art however does not solve the problem to supply heat energy especially in the cold start phase to the desired heat sinks, without withdrawing too much energy from the exhaust in this phase and without increasing the exhaust counter pressure.

It would therefore be desirable and advantageous to provide an improved exhaust gas system with which a targeted heat transport is possible without withdrawing too much energy from the exhaust gas in defined operating situations.

SUMMARY OF THE INVENTION

According to one aspect of the present invention, an exhaust system for an internal combustion engine includes an evaporator which includes an exhaust gas pipe, a sleeve pipe and a capillary structure, wherein the capillary structure is formed as a porous body between the evaporator and the exhaust gas pipe, and a condenser connected to the evaporator by conduits, wherein an operating medium for transporting heat withdrawn from exhaust gas in form of heat energy transitions from a liquid state to a gaseous state when traversing the capillary structure.

A capillary structure in the context of the invention relates to a porous body, for example made of a stainless steel or a ceramic material, wherein a capillary action brought about by the pores causes a transport of the operating medium.

Within the context of the invention, the operating medium can be transported in the liquid aggregate state due to the capillary action of the capillary structure. Within the context of the invention, however, the operating medium can also be transported in the gaseous aggregate state due to the capillary action. Within the context of the invention, a mixture between the gaseous and the liquid aggregate state i.e. a wet vapor, can also be transported. In the context of the invention, it is further possible, that the operating medium transitions during the transport from the liquid aggregate state into the gaseous aggregate state. In the context of the invention, the capillary structure is chosen in particular so that a pump effect for the operating medium is generated within the capillary structure. The capillary structure can thus not only pump or respectively, transport the operating medium in the direction of gravity but also pump or respectively, transport the operating medium for example horizontally.

According to the invention, instead of via conventional heat pipes the heat is used via so called circulation heat pipes also referred to as Loop Heat Pipes. A circulation heat pipe is formed by an evaporator, a condenser and the conduits for the vapor and liquid flow, which arises between evaporator and condenser. A closed circulation results between the previously mentioned structural components. The transferred heat amount can in this case occur actively for example through control valves or passively through adjustment to the respectively expected operating core parameters. The circulation of the operating medium in the circulation heat pipe itself is due to a pressure difference in the evaporator between the region of the evaporation and the region of the return flow of the operating medium in the liquid aggregate state. According to the invention, the two regions gaseous and liquid are separated by the capillary structure in the evaporator.

In the exhaust system according to the invention, the evaporator is arranged on the side of the heat source, here in form of the pipe which carries the exhaust gas. The condenser is arranged on the side of a heat sink, where an introduction of an additional heating power is required, for example in a cold start phase. This can for example, occur in a transmission or a separate heat exchanger, which in turn is for example used for heating the passenger compartment of the motor vehicle.

According to the invention, the conduits which connect the condenser to the evaporator have no capillary structure thus offering great freedom for design or respectively installation of these conduits which transport the heat. According to the invention, this has in the advantage that compared to conventional I-shaped heat pipes small bending radii or the like do not have to be strictly observed. In particular when heat is transported in the underfloor areas of a motor vehicle the invention offers advantages, so that already available installation spaces can be used in motor vehicles for the present invention without having to be further modified. In order to further increase the efficiency of the exhaust gas system according to the invention and to optimally use the heat in the exhaust gas, the exhaust gas pipe has heat exchange surfaces which are oriented inwardly. In the context of then invention, oriented inwardly means that the heat exchange surfaces protrude relative to an essentially smooth pipe wall, i.e. they are elevations, for example fin-like structures, which serve for increasing the surfaces which participate in the heat exchange. The heat exchanger surfaces are directly coupled to the exhaust gas pipe, so that an inner pipe surface which absorbs the heat energy from the exhaust by convection and radiation is correspondingly increased by the heat exchange surfaces. The heat exchanger surfaces are preferably formed from the same material as and in one piece with the exhaust gas pipe, so that heat is conducted from the heat exchanger surfaces into the exhaust gas pipe and to the outer sheath surface of the exhaust gas pipe at a low loss.

In particular, the heat exchanger surfaces extend parallel to the direction of flow, preferably every second heat exchanger surface extends radially into a center region of the exhaust gas pipe and the other heat exchanger surfaces are constructed shorter relative to the ones which protrude into the center region of the exhaust gas pipe. Due to the orientation of the heat exchanger surface parallel to the direction of the exhaust gas flow, an insignificant increase in the exhaust gas counter pressure results. Due to the arrangement in which each short heat exchanger surface is adjacent to a long heat exchanger surface, the internal space of the available cross sectional surface is used optimally.

A particular advantage of the invention is that the capillary structure between the exhaust pipe and the sleeve pipe is configured as intermediate layer. The capillary structure delivers the operating medium which is in the liquid aggregate state with in the heat pipe to the outer sheath surface of the exhaust gas pipe, where it is converted into the gaseous aggregate state by warmth or respectively heat. Due to the capillary structure a targeted transport of the operating medium which is in the heat pipe is thus ensured.

In order to further increase the efficiency, the capillary structure has vapor fins in the region of the outer sheath surface of the exhaust gas pipe. The vapor fins are in particular configured to extend parallel to the direction of flow of the exhaust gas which flows in the exhaust pipe. Within the context of the invention, the vapor fins can however also be formed transverse relative to the direction of flow or for example in form of a zigzag pattern or a serpentine conduit. The operating medium in the circulation heat pipe evaporates in the vapor fins, transitions from the liquid aggregate state to the gaseous aggregate state and thereby correspondingly absorbs heat energy.

In order to correspondingly conduct this heat energy to a heat sink, i.e. the condenser, the vapor fins are in particular directly connected to an exit opening which leads out of the condenser. Preferably, a conduit is connected to the condenser through the exit opening for supplying operating medium.

In a further preferred embodiment, fluid grooves are formed on the inner sheath surface of the sleeve pipe. The fluid grooves can also extend parallel to the direction of flow of the exhaust gas. Through the fluid grooves the operating medium which comes from the condenser in the liquid aggregate state is distributed in the evaporator and conducted preferably to the vapor grooves. The evaporator can thus be installed in a motor vehicle in any desired spatial orientation because the operating medium is always conducted in liquid form to the outer sheath surface of the exhaust pipe, in particular into the vapor grooves where it is converted to the gaseous aggregate state.

In a further embodiment, the fluid grooves are directly connected to a fluid entry opening which leads into the evaporator. The operating medium which comes from the condenser in liquid form can thus be conducted directly into the capillary structure via the fluid grooves, also over the entire length of the evaporator.

A further particularly advantageous embodiment of the present invention is an exhaust gas pipe with a bypass flap. In particular, the exhaust gas pipe has a dual branch configuration, wherein a first internal flow passage is configured for directly conducting the exhaust gas and a second outer flow passage is configured with heat exchanger fins. An exhaust gas stream is preferably conducted through the first and/or the second flow passage via the bypass valve.

The dual branch configuration of the exhaust pipe provides an evaporator which, in particular in operating states of the internal combustion engine with high exhaust gas throughput, transfers the exhaust gas directly to the downstream positioned exhaust gas components through an internal first flow passage thereby minimizing the exhaust gas counter pressure. In operating states in which a high throughput rate is not yet established, for example during the cold start phase, the exhaust gas can be diverted through the bypass valve so that it first flows through an outer second flow passage which surrounds the inner exhaust gas pipe, wherein heat exchange fins are arranged in the second flow passage, which increase the surface and thus correspondingly withdraw a higher amount of heat from the exhaust gas.

Preferably, a heat exchange chamber extends circumferentially between the first and the second flow passage in flow direction of the exhaust gas. The heat exchange chamber performs the evaporation function so that an operating medium is converted from the liquid state into the gaseous state by corresponding heat energy which on one hand, can be introduced by the second flow passage, but can also by the first flow passage, or by both flow passages. Through corresponding connection conduits on the heat exchange chamber, liquid operating medium can be supplied and gaseous operating medium discharged.

In a preferred embodiment, at least parts of the heat exchange chamber are occupied by a capillary structure. Further, preferably, a fluid passage is located in the heat exchange chamber. The fluid passage is again preferably limited inwardly and outwardly by the capillary structure. A fluid volume is thus conducted to the sheath surfaces of the inner and/or outer flow passages due to the capillary action where it can evaporate under the influence of the heat which was withdrawn from the exhaust gas.

In a further preferred embodiment, vapor grooves are formed on the respective sheath surfaces of the first and/or second flow passage in the heat exchange chamber, wherein the vapor grooves preferably extend parallel to the direction of flow of the exhaust gas. The above described advantages of the vapor grooves also apply analogously to this embodiment.

In a further preferred embodiment, the heat transport between the evaporator and the condenser can be adjusted by open loop and closed loop control, preferably by a valve. In particular, a thermo sensor is arranged in the circulation heat pipe, particularly preferably upstream of the evaporator. This allows adjusting the corresponding fluid to a constant operating temperature and/or holding the component or medium to be heated at a constant temperature through a relatively simple control of the circulation heat pipe, in which a sensor is arranged on the side of the fluid to be heated.

In order to increase the range of options for control, a reservoir is particularly provided between the evaporator and the condenser, wherein the reservoir temporarily stores the operating medium of the conduits. This ensures that in particular when great heat amounts have to be transferred, no drying out due to a complete evaporation and/or due to bound operating medium occurs. A targeted tapping of the operating medium from the reservoir in the respectively desired aggregate state is possible.

Within the context of the invention, a particularly high efficiency for transferring the heat amount is achieved particularly with the circulation heat pipe. The aging behavior of the heat sinks, for example operating media in form of transmission and motor oils, which are heated up by the heat pipe according to the invention, is improved by enabling a constant temperature adjustment. In particular, the conduits which are arranged between the evaporator and the condenser have no capillary structure which allows particularly favorable design possibilities with regard to bends, height differences and relative movements between the condenser and evaporator.

The exhaust system according to the invention has only little loss of efficiency related to vibrations, diversions and height differences. In particular, the exhaust system according to the invention is usable in a modular fashion, so that multiple evaporators and/or multiple condensers can be coupled to one another via different conduits. A different control of the individual evaporators or respectively, condensers is possible via bypass or way valves, so that a broad range of operating possibilities can be realized. In particular the construction of the two-conduit system, wherein one conduit conducts the vapor flow of the operating medium and the other conduit the fluid flow of the operating medium, a particularly high efficiency of the circulation heat pipe according to the invention results.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
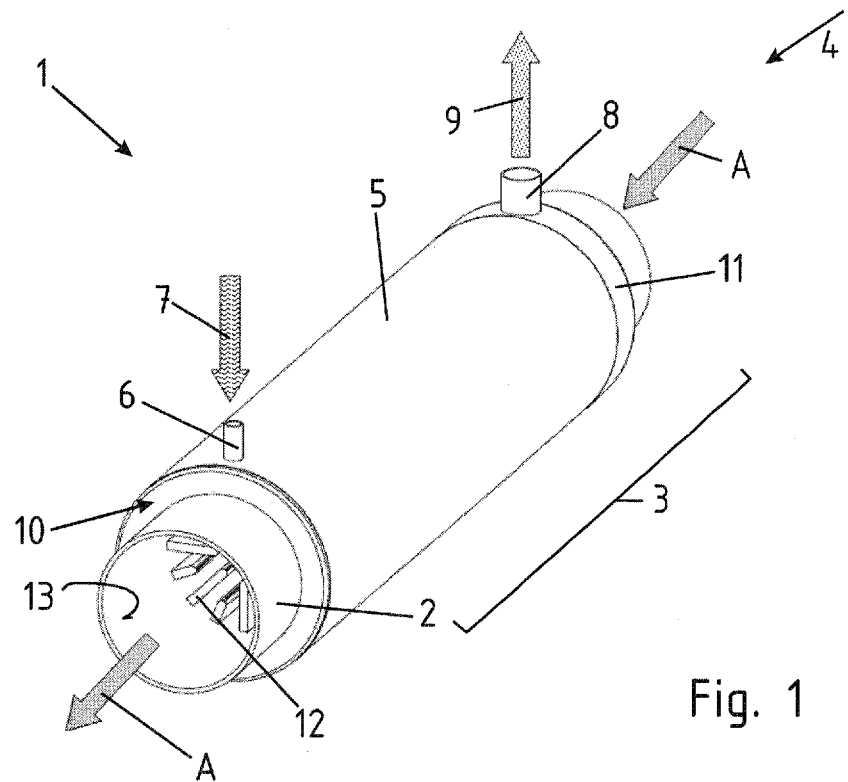
FIG. 1 is an exhaust system according to the invention with an evaporator in a perspective view.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom conduits, diagrammatic representations and fragmentary views. In certain instances, details which are not necessary for an understanding of the present invention or which render other details difficult to perceive may have been omitted.

Turning now to the drawing, and in particular to FIG. 1, there is shown an exhaust gas system 1, wherein exhaust gas A flows into an exhaust pipe 2 and exits at an opposing side. The exhaust gas pipe 2 is surrounded in a section 3 in longitudinal direction 4 by an evaporator 5. The evaporator 5 has an entry opening 6 for entry of the operating medium in the liquid aggregate state 7 and an exit opening 8 for exiting of the operating medium in the gaseous aggregate state 9. On a head side of the condenser 5, the condenser 5 is closed by a cover plate 10. On the side opposite the cover plate 10, the condenser 5 has a stopper 11. This results in an easy manufacturability, because the evaporator 5 is slidable onto the exhaust gas pipe 2. Inside the exhaust gas pipe 2 are heat exchanger surfaces 12, which increase the surface 13 used for the heat exchange with the hot exhaust gas A.

Figure 2:
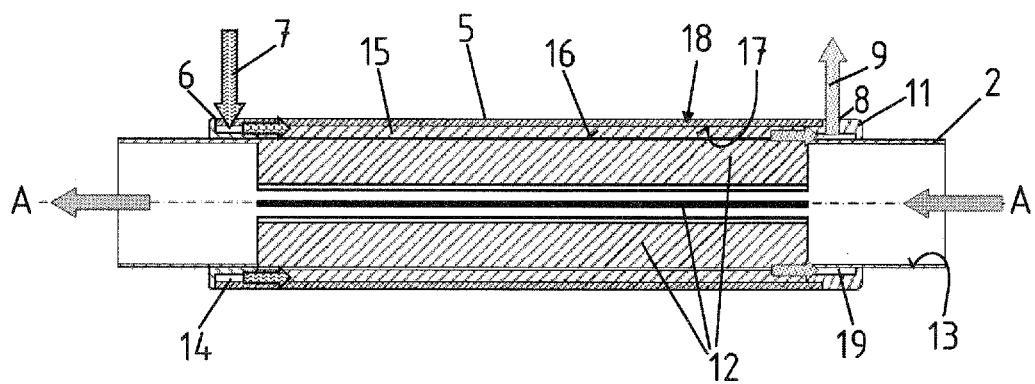
FIG. 2 is a longitudinal cross section through the evaporator.

FIG. 2 shows a longitudinal cross section through the exhaust gas pipe shown in FIG. 1 with mounted evaporator 5. The internal exhaust gas pipe 2 is configured for flow through of the exhaust gas A from with regard to the image plane right to left. Inside the exhaust gas pipe 2 are the heat exchange surfaces 12, which increase the surface 13 for absorbing heat form the exhaust gas A, mainly through forced convection.

The entry opening 6 is located on the left side with regard to the image plane, and has a circumferential entry passage 14 for the operating medium in the liquid aggregate state 7. The operating medium in the liquid aggregate state 7 flows with regard to the image plane from left to right into the evaporator 5 where it is converted into the gaseous aggregate state 9. In order to use the evaporator 5 independent of gravity and thus independent of the site of installation, a capillary structure 15 is arranged between an outer sheath surface 16 of the exhaust gas pipe 2 and an inner sheath surface 17 of the sleeve pipe 18. The evaporator 5 functions analogous to a heat exchanger according to the counter current principle. On the right side with regard to the image plane, the stopper 11 is arranged with the exit opening 8 for discharging the operating medium in the gaseous aggregate state 9. Between the stopper 11 and the outer sheath surface 16 of the exhaust gas pipe 2 a circumferential exit passage 19 is provided, which accumulates the operating medium 9 in the gaseous aggregate state and discharges the operating medium 9 through the exit opening 8.

Figure 3:
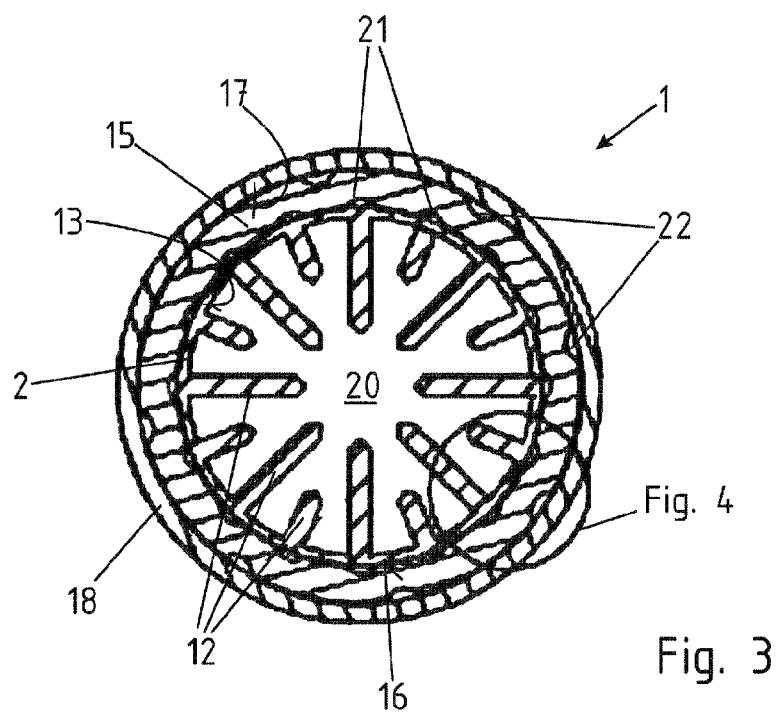
FIG. 3 is a cross section through the evaporator.

FIG. 3 shows a cross sectional view through an exhaust gas system 1 according to the invention, wherein the surface 13 of the internal exhaust gas pipe 2 is strongly increased by the heat exchanger surfaces 12. It can clearly be seen that a longer heat exchanger surface 12 which protrudes into a center region of the exhaust gas pipe 2 is always arranged adjacent to a respective shorter heat exchanger surface 12. This optimally adjusts the cross sectional surface of the exhaust gas pipe 2 with regard to the surface 13 to be increased for heat transfer without significantly increasing the exhaust gas counter pressure. The capillary structure 15 is arranged between the outer sheath surface 16 of the exhaust gas pipe and the inner sheath surface 17 of the sleeve pipe 18. In the region of the outer sheath surface 16 of the exhaust gas pipe 2 vapor grooves 21 are arranged and in the region of the inner sheath surface 17 of the sleeve pipe 18 fluid grooves 22 are arranged. The cross sectional geometry of the exhaust gas pipe 2 is not limited to the circular shape. Polygonal, in particular square or triangular shapes are also possible.

Figure 4:
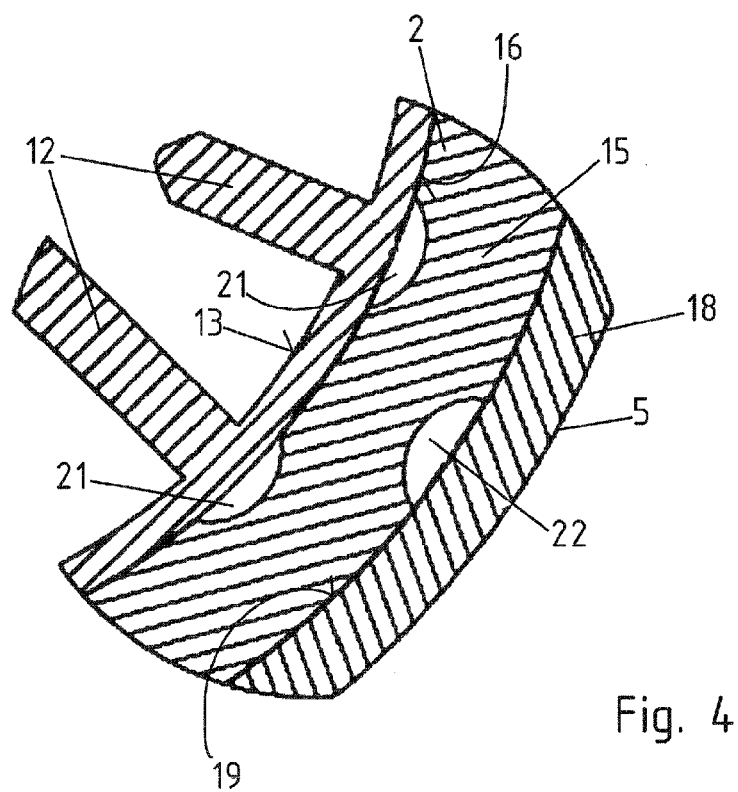
FIG. 4 is a detail view of the outer wall in a cross sectional view of the evaporator.

This can be seen clearly in the detail view according to FIG. 4. In a preferred embodiment, the fluid grooves 22 are directly coupled to the entry passage which is not further shown and the vapor grooves 21 to the exit passage which is not further shown. Thus, by supplying the operating medium via the grooves 21, 22 in the respectively required aggregate state, sufficient amounts of operating medium are also available over the length of the not further shown section in order to achieve a corresponding heat exchange efficiency. Through the capillary structure 15 the operating medium is conducted independent of the location of installation, mounting position or gravity, so that the evaporator 5 according to the invention always operates with high efficiency.

Figure 5:
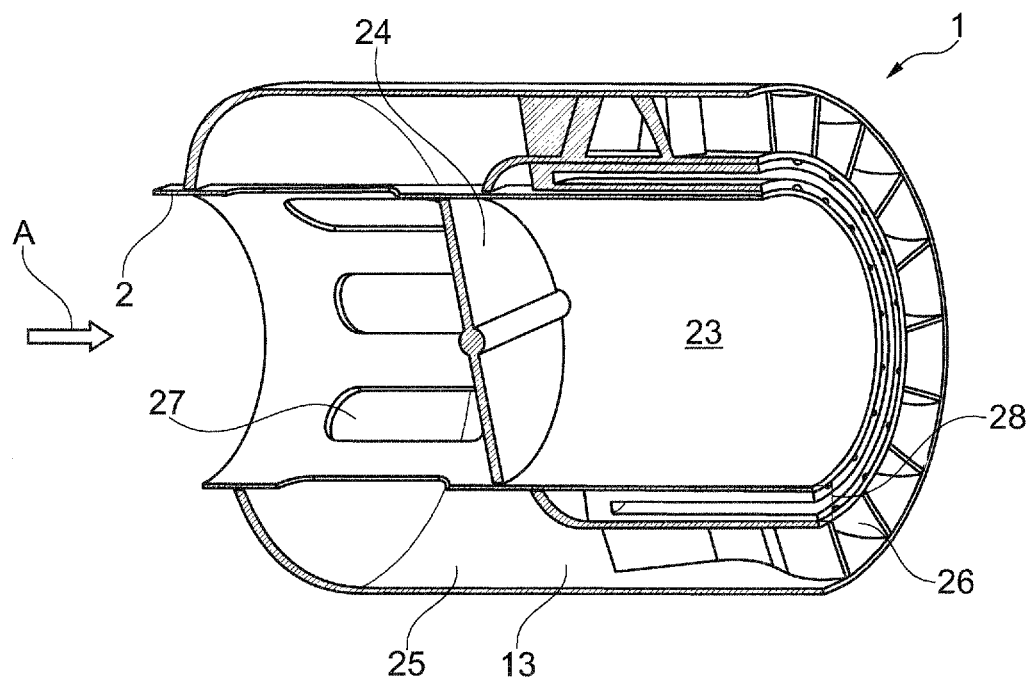
FIG. 5 is a sectional view of a second embodiment of an evaporator.

FIG. 5 shows a further embodiment of an exhaust gas system 1 according to the invention, wherein the exhaust gas pipe 2 in FIG. 5 is configured two-branched. A first internal flow passage 23 is configured for directly conducting exhaust gas A so that here no flow impediments are arranged. The inner flow passage 23 can be controlled via a bypass flap 24. A second outer flow passage 25 which surrounds the first inner flow passage 23, has heat exchanger fins 26 which increase the available surface 13 of the second outer flow passage 25 so that a high heat withdrawal of the conducted through exhaust gas A occurs.

To allow exhaust gas A to enter the second outer flow passage 25, the inner exhaust gas pipe 2 is provided with exhaust gas entry openings 27 which when the bypass flap 24 is closed or partially closed cause a forced diversion of the exhaust gas through the second outer flow passage 25. A heat exchange chamber 28 is arranged between the outer flow passage 25 and the inner flow passage 23.

Figure 6:
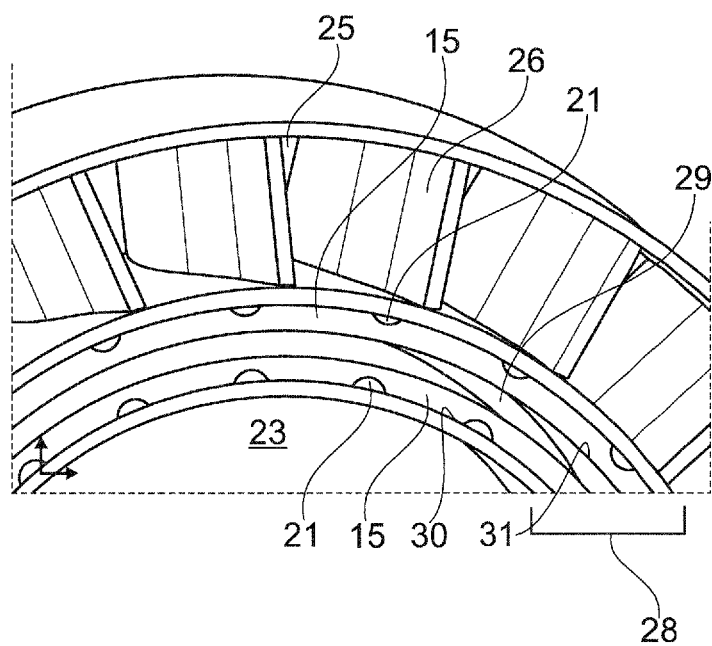
FIG. 6 is a detail view in a cross section of the evaporator from FIG. 5.

A detail view of the structure of the heat exchange chamber 28 is shown in FIG. 6. In a preferred embodiment, the heat exchange chamber 28 is provided with an inner fluid passage 29, which in turn accommodates an operating medium in the liquid aggregate state. The fluid passage 29 neighbors a capillary structure 15, which conducts the medium in the liquid aggregate state to the outer sheath surface 30 of the inner flow passage 23 and to the inner sheath surface 31 of the outer flow passage 25.

Particularly preferably, the previously mentioned sheath surfaces 30, 31 again have vapor grooves 21. Within the context of the invention, it is thus possible to correspondingly adjust the amount of heat which is withdrawn from the exhaust gas A when conducting the exhaust gas A through the inner flow passage 23 as well as through the outer flow passage 25. At particularly high throughput rates in the high load and/or high speed range of the internal combustion engine it is possible to directly conduct the exhaust gas A through the inner flow passage 23 by completely opening the bypass flap 24 without at the same time significantly increasing the exhaust gas counter pressure.

Figure 7:
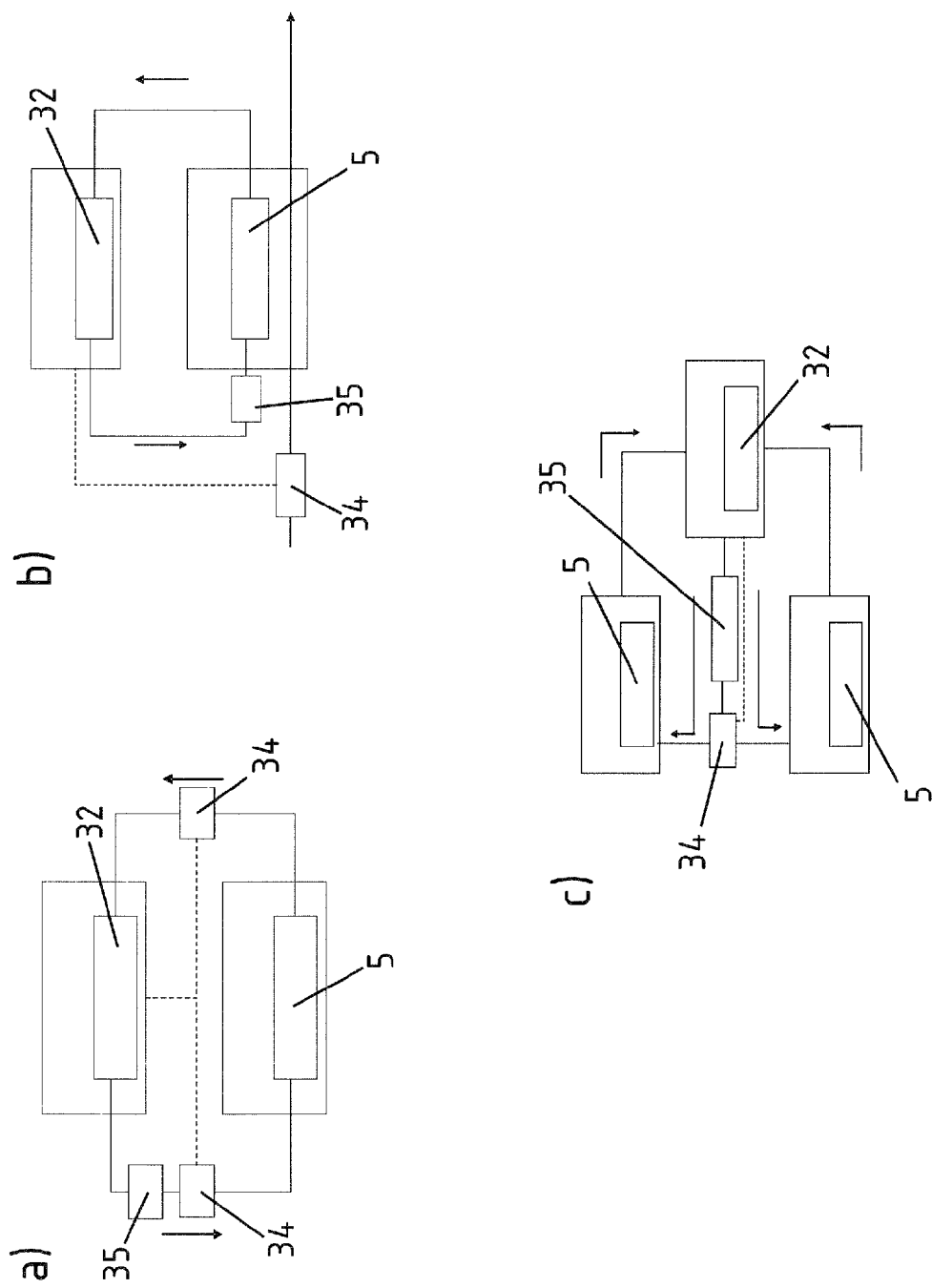
FIG. 7a to c are control and flow diagrams of different exhaust gas systems according to the invention.

FIGS. 7*a* to *c* show three different arrangement variants of the exhaust gas system 1 according to the invention in a schematic flow diagram.

FIG. 7*a* shows a construction of an exhaust gas system 1 according to the invention which includes an evaporator 5 and a condenser 32, wherein the condenser 32 and the evaporator 5 are coupled to one another via conduits 33. The conduit 33 which is shown on the right side with regard to the image plane conducts the operating medium 9 in the gaseous aggregate state, the conduit shown on the left side with regard to the image plane conducts the operating medium 7 in the liquid aggregate state. In both conduits 33 a device for open loop and closed loop control 34 is arranged, which can short circuit the circulation according to the invention. Further, a reservoir 35 is integrated in the circulation, which contains a fluid reserve, so that a drying out of the circulation through the evaporator 5 is prevented.

FIG. 7*b* shows a second embodiment of an exhaust gas system 1 according to the invention, which again includes a condenser 32 and an evaporator 5, wherein a device for open loop and closed loop control 34 is integrated into the exhaust gas pipe 2 and coupled directly to the condenser 32. In this case, a control is carried out via the exhaust gas A and not via the operating medium 7, 9. Such a device for open loop and closed loop control can for example be formed by the bypass flap 24 shown in FIG. 5. Further, a reservoir 35 is provided upstream of the evaporator 5 so that again a drying out of the circuit is prevented.

FIG. 7*c* shows a parallel connection of and exhaust gas system 1 according to the invention, wherein here two evaporators 5 are connected to a condenser 32 and can be controlled by a device for open loop and closed loop control 34.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letter Patent is set forth in the appended claims and includes equivalents of the elements recited therein:

What is claimed is:

1. An exhaust gas system for an internal combustion engine, comprising:
    an evaporator comprising an exhaust gas pipe, a sleeve pipe and a capillary structure, said capillary structure formed as a porous body between the sleeve pipe and the exhaust gas pipe and comprising vapor groover provided in the capillary structure in an area of outer sheath surface of the exhaust gas pipe and fluid grooves provided in the capillary structure in an area of an inner sheath surface of the sleeve pipe;
    wherein an operating medium for transporting heat which was withdrawn from exhaust gas in a form of heat energy transitions from a liquid state to a gaseous state when traversing the capillary structure; and
    a condenser connected to the evaporator via conduits.

2. The exhaust gas system of claim 1, wherein the exhaust gas pipe has inwardly oriented heat exchanger surfaces.

3. The exhaust gas system of claim 2, wherein the heat exchanger surfaces extend parallel to a direction of flow.

4. The exhaust gas system of claim 3, wherein longer ones of the heat exchanger surfaces protrude radially into a center area of the exhaust gas pipe, said longer heat exchanger surfaces alternating with shorter ones of the heat exchanger surfaces along a circumferential direction of the exhaust gas pipe.

5. The exhaust gas system of claim 1, wherein the fluid grooves are directly connected to a fluid entry opening.

6. The exhaust gas system of claim 1, wherein the vapor grooves are directly connected to an exit opening.

7. The exhaust gas system of claim 1, wherein the exhaust gas pipe comprises a bypass flap.

8. The exhaust gas system of claim 1, wherein the exhaust gas pipe comprises a first inner flow passage for directly conducting the exhaust gas and a second outer flow passage, said second flow passage being provided with heat exchanger fins.

9. The exhaust gas system of claim 7, wherein the exhaust gas is conductible through the first and/or second flow passages via the bypass flap.

10. The exhaust gas system of claim 8, further comprising a heat exchange chamber disposed between the first and the second flow passage said heat exchange chamber extending radially relative to a direction of flow of the exhaust gas.

11. The exhaust gas system of claim 10, wherein the heat exchange chamber is occupied at least in part by the capillary structure.

12. The exhaust gas system of claim 10, wherein a fluid passage is formed in the heat exchange chamber.

13. The exhaust gas system of claim 10, wherein vapor grooves are formed in the heat exchange chamber, said vapor grooves extending parallel to the direction of flow of the exhaust gas.

14. The exhaust gas system of claim 1, wherein a heat transport between the evaporator and the condenser is controllable by open loop and closed loop control.

15. The exhaust gas system of claim 14, wherein the open loop and closed loop control is implemented by a valve.

16. The exhaust gas system of claim 1, further comprising a thermo sensor arranged upstream of the evaporator.

17. The exhaust gas system of claim 1, further comprising a reservoir arranged between the evaporator and the condenser, for temporarily storing the operating medium.

* * * * *